US007523266B2

(12) United States Patent
Chaudhry et al.

(10) Patent No.: US 7,523,266 B2
(45) Date of Patent: Apr. 21, 2009

(54) METHOD AND APPARATUS FOR ENFORCING MEMORY REFERENCE ORDERING REQUIREMENTS AT THE L1 CACHE LEVEL

(75) Inventors: Shailender Chaudhry, San Francisco, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 347 days.

(21) Appl. No.: 11/592,836

(22) Filed: Nov. 3, 2006

(65) Prior Publication Data

US 2007/0186053 A1 Aug. 9, 2007

Related U.S. Application Data

(60) Provisional application No. 60/765,945, filed on Feb. 6, 2006.

(51) Int. Cl.
*G06F 12/00* (2006.01)

(52) U.S. Cl. .................. 711/141; 711/125; 711/144; 711/158; 712/216

(58) Field of Classification Search .............. 711/141, 711/125, 144, 158; 712/216
See application file for complete search history.

(56) References Cited

U.S. PATENT DOCUMENTS 6,490,654 B2 * 12/2002 Wickeraad et al. .......... 711/133

| 6,938,130 | B2 * | 8/2005 | Jacobson et al. | ............ 711/144 |
| 7,089,374 | B2 * | 8/2006 | Tremblay et al. | ........... 711/145 |
| 7,114,060 | B2 * | 9/2006 | Chaudhry et al. | ........... 712/219 |
| 7,206,903 | B1 * | 4/2007 | Moir et al. | .................. 711/145 |
| 7,269,694 | B2 * | 9/2007 | Tremblay et al. | ........... 711/141 |
| 2002/0199066 | A1 | 12/2002 | Chaudhry et al. | |
| 2005/0154805 | A1 | 7/2005 | Steely, Jr. et al. | |

FOREIGN PATENT DOCUMENTS

WO    03001383 A2    1/2003

* cited by examiner

*Primary Examiner*—Stephen C Elmore
(74) *Attorney, Agent, or Firm*—Park, Vaughan & Fleming LLP

(57) ABSTRACT

One embodiment of the present invention provides a system that enforces memory reference ordering requirements, such as Total Store Ordering (TSO), at a Level 1 (L1) cache in a multiprocessor. During operation, while executing instructions in a speculative-execution mode, the system receives an invalidation signal for a cache line at the L1 cache wherein the invalidation signal is received from a cache-coherence system within the multiprocessor. In response to the invalidation signal, if the cache line exists in the L1 cache, the system examines a load-mark in the cache line, wherein the load-mark being set indicates that the cache line has been loaded from during speculative execution. If the load-mark is set, the system fails the speculative-execution mode and resumes a normal-execution mode from a checkpoint. By failing the speculative-execution mode, the system ensures that a potential update to the cache line indicated by the invalidation signal will not cause the memory reference ordering requirements to be violated during the speculative-execution mode.

21 Claims, 10 Drawing Sheets

US 7,523,266 B2

METHOD AND APPARATUS FOR ENFORCING MEMORY REFERENCE ORDERING REQUIREMENTS AT THE L1 CACHE LEVEL

RELATED APPLICATION

This application hereby claims priority under 35 U.S.C. §119 to U.S. Provisional Patent Application No. 60/765,945, filed on 6 Feb. 2006, entitled "Method and Apparatus for Enforcing Memory Reference Ordering Requirements at the L1 Cache Level," by inventors Shailender Chaudhry and Marc Tremblay.

BACKGROUND

1. Field of the Invention

The present invention relates to techniques for improving computer system performance. More specifically, the present invention relates to a method and an apparatus for enforcing memory reference ordering requirements, such as Total Store Ordering (TSO), at the L1 cache level.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

Efficient caching schemes can help reduce the number of memory accesses that are performed. However, when a memory reference, such as a load operation generates a cache miss, the subsequent access to level-two (L2) cache or memory can require dozens or hundreds of clock cycles to complete, during which time the processor is typically idle, performing no useful work.

A number of forms of "speculative execution" have been proposed or are presently used to hide this cache-miss latency. Some processors support out-of-order execution, in which instructions are kept in an issue queue, and are issued "out-of-order" when operands become available. A given instruction is retired from the issue queue only when all preceding instructions have completed.

Some processor designers have proposed generating a checkpoint and entering a "scout mode" during processor stall conditions. In scout mode, instructions are speculatively executed to prefetch future loads and stores, but results are not committed to the architectural state of the processor. For example, see U.S. patent application Ser. No. 10/741,944, filed 19 Dec. 2003, entitled, "Generating Prefetches by Speculatively Executing Code through Hardware Scout Threading," by inventors Shailender Chaudhry and Marc Tremblay. This solution to the latency problem eliminates the complexity of the issue queue. However, it suffers from the disadvantage of having to re-compute results of computational operations that were performed during scout mode.

To avoid performing these re-computations, processor designers have proposed entering an "execute-ahead" mode, wherein instructions that cannot be executed because of unresolved data dependencies are deferred, and wherein other non-deferred instructions are executed in program order. When an unresolved data dependency is ultimately resolved during execute-ahead mode, the system executes deferred instructions in a deferred mode, wherein deferred instructions that are able to be executed are executed in program order, and wherein other deferred instructions that still cannot be executed because of unresolved data dependencies are deferred again. For example, see U.S. patent application Ser. No. 10/686,061, filed 14 Oct. 2003, entitled, "Selectively Deferring the Execution of Instructions with Unresolved Data Dependencies as They Are Issued in Program Order," by inventors Shailender Chaudhry and Marc Tremblay.

One problem with the above-described techniques for performing speculative execution is that it is hard to ensure that a multiprocessor adheres to a specific memory model, such as Total Store Ordering (TSO), as is required for correct operation of many parallel applications. For example, for a given thread, the TSO memory model requires that: (1) any two loads must complete in program order; (2) any two stores must complete in program order; (3) any store must complete after an earlier load in program order. However, note that loads can overtake subsequent stores if there is no Read-After-Write (RAW) hazard. Furthermore, as stores are visible to all threads, there must be a total ordering of all stores and a partial ordering of loads and stores.

To ensure that memory models (such as TSO) are not violated, some systems use a memory-disambiguation buffer to track loads that have completed during speculative execution. Store operations that take place during speculative execution are compared against entries in the memory-disambiguation buffer to determine whether the store can potentially cause a violation of the memory model. If so, the system can perform some type of remedial action. Unfortunately, memory-disambiguation buffers are generally implemented as large Content-Addressable Memory (CAM) structures, which do not scale well as systems support larger amounts of concurrent execution. For example, it is very hard to build a large CAM structure with a large number of ports to support concurrent accesses to a banked L2 cache.

Hence, what is needed is a method and an apparatus for enforcing memory models, such as TSO, without the drawbacks of existing mechanisms, such as memory-disambiguation buffers.

SUMMARY

One embodiment of the present invention provides a system that enforces memory reference ordering requirements, such as Total Store Ordering (TSO), at a Level 1 (L1) cache in a multiprocessor. During operation, while executing instructions in a speculative-execution mode, the system receives an invalidation signal for a cache line at the L1 cache wherein the invalidation signal is received from a cache-coherence system within the multiprocessor. In response to the invalidation signal, if the cache line exists in the L1 cache, the system examines a load-mark in the cache line, wherein the load-mark being set indicates that the cache line has been loaded from during speculative execution. If the load-mark is set, the system fails the speculative-execution mode and resumes a normal-execution mode from a checkpoint. By failing the speculative-execution mode, the system ensures that a potential update to the cache line indicated by the invalidation signal will not cause the memory reference ordering requirements to be violated during the speculative-execution mode.

In a variation on this embodiment, prior to receiving the invalidation signal the system enters the speculative-execution mode by first issuing instructions for execution in program order during a normal-execution mode. Next, upon encountering a condition (a launch condition) during an instruction (a launch-point instruction), which causes the processor to enter the speculative-execution mode, the system generates a checkpoint that can subsequently be used to return execution of the program to the launch-point instruction, and commences execution in the speculative-execution mode.

In a further variation, commencing execution in the speculative-execution mode involves: clearing load-marks from all cache lines in the L1 cache; configuring the L1 cache so that a subsequent load operation from a cache line during the speculative-execution mode causes a corresponding load-mark in the cache line to be set; and gating a store buffer so that the store buffer will not release stores that are generated during the speculative-execution mode.

In a further variation, failing the speculative-execution mode involves using the checkpoint to resume execution in the normal-execution mode from the launch-point instruction.

In a further variation, if the launch condition is an unresolved data dependency encountered while executing the launch-point instruction, the speculative-execution mode is an execute-ahead mode, wherein instructions that cannot be executed because of an unresolved data dependency are deferred, and wherein other non-deferred instructions are executed in program order.

In a further variation, if the unresolved data dependency is resolved during execute-ahead mode, the system executes deferred instructions in a deferred mode, wherein deferred instructions that able to be executed are executed in program order, and wherein other deferred instructions that still cannot be executed because of unresolved data dependencies are deferred again. If some deferred instructions are deferred again during the deferred mode, the system returns to execute-ahead mode at the point where execute-ahead mode left off. On the other hand, if all deferred instructions are executed in the deferred mode, the system returns to the normal-execution mode to resume normal program execution from the launch-point instruction.

In a further variation, returning to the normal-execution mode involves ungating a store buffer so that the store buffer releases stores that were generated during the speculative-execution mode.

In a further variation, generating the checkpoint involves saving a precise architectural state of the processor to facilitate subsequent recovery from exceptions that arise during the speculative-execution mode.

In a variation on this embodiment, if the launch condition is a stall condition (such as a store buffer full condition), the speculative-execution mode is a scout mode, wherein instructions are speculatively executed to prefetch future loads and stores, but wherein results are not committed to the architectural state of the processor.

In a variation on this embodiment, if a load-marked cache line is evicted from the L1 cache (which is typically multi-way set associative) during the speculative-execution mode, the system fails the speculative-execution mode and resumes the normal-execution mode from the checkpoint.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Processor

Figure 1:
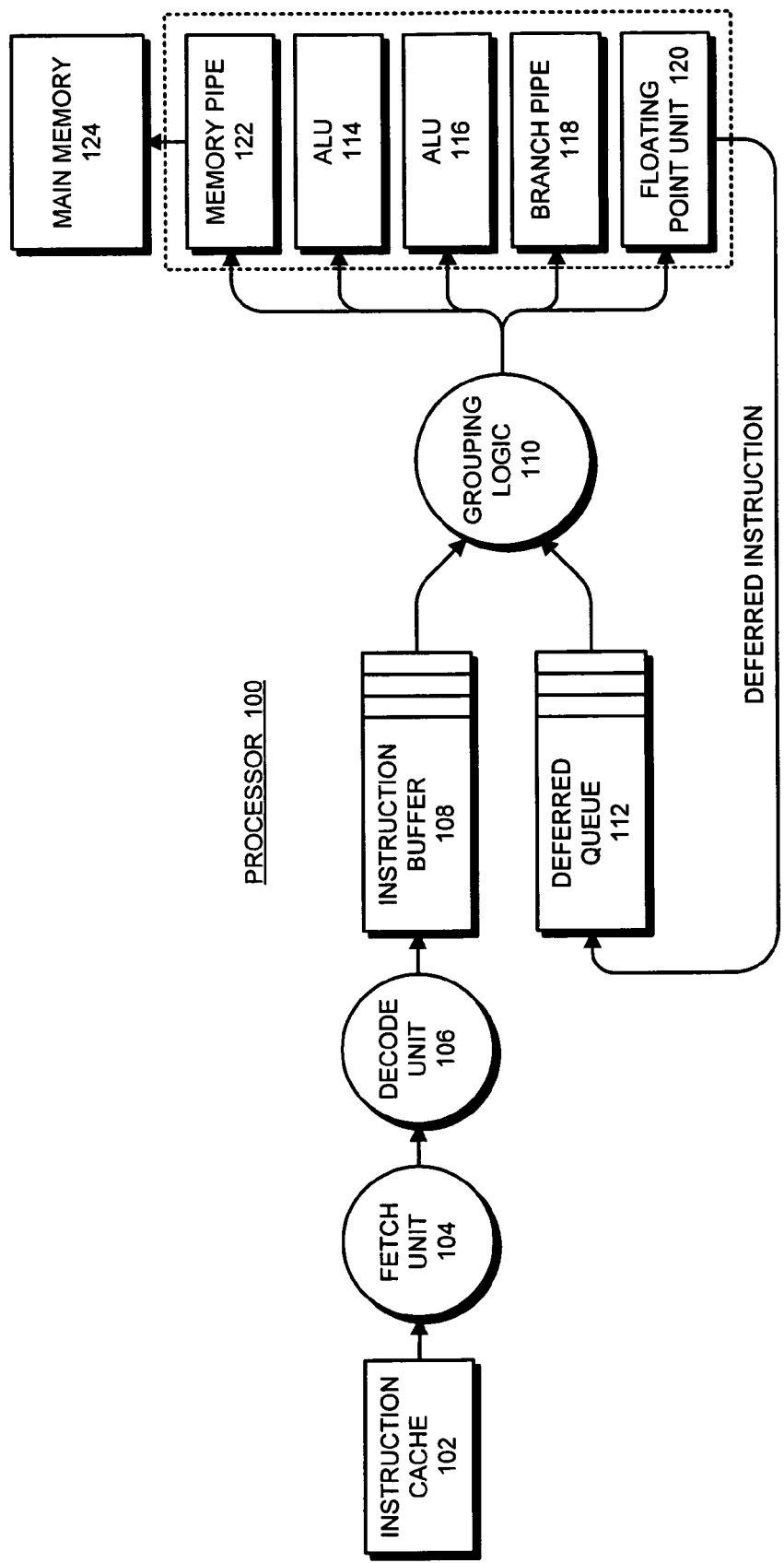
FIG. 1 illustrates a processor in accordance with an embodiment of the present invention.

FIG. 1 illustrates the design of a processor 100 in accordance with an embodiment of the present invention. Processor 100 can generally include any type of processor, including, but not limited to, a microprocessor, a mainframe computer, a digital signal processor, a personal organizer, a device controller and a computational engine within an appliance. As is illustrated in FIG. 1, processor 100 includes instruction cache 102, fetch unit 104, decode unit 106, instruction buffer 108, deferred queue 112, grouping logic 110, memory 124, arithmetic logic unit (ALU) 114, ALU 116, branch pipe 118, floating point unit 120 and memory pipe 122.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing memory 124), ALU 114, ALU 116, branch pipe 118 (which resolves control transfer computations), and floating point unit 120.

If an instruction cannot be executed due to an unresolved data dependency, such as an operand that has not returned from a load operation, the system defers execution of the instruction and moves the instruction into deferred queue 112. Note that like instruction buffer 108, deferred queue 112 is also organized as a FIFO buffer.

When the data dependency is eventually resolved, instructions from deferred queue 112 are executed in program order with respect to other deferred instructions, but not with respect to other previously executed non-deferred instructions. This process is described in more detail below with reference to FIG. 4.

Buffers

Figure 2:
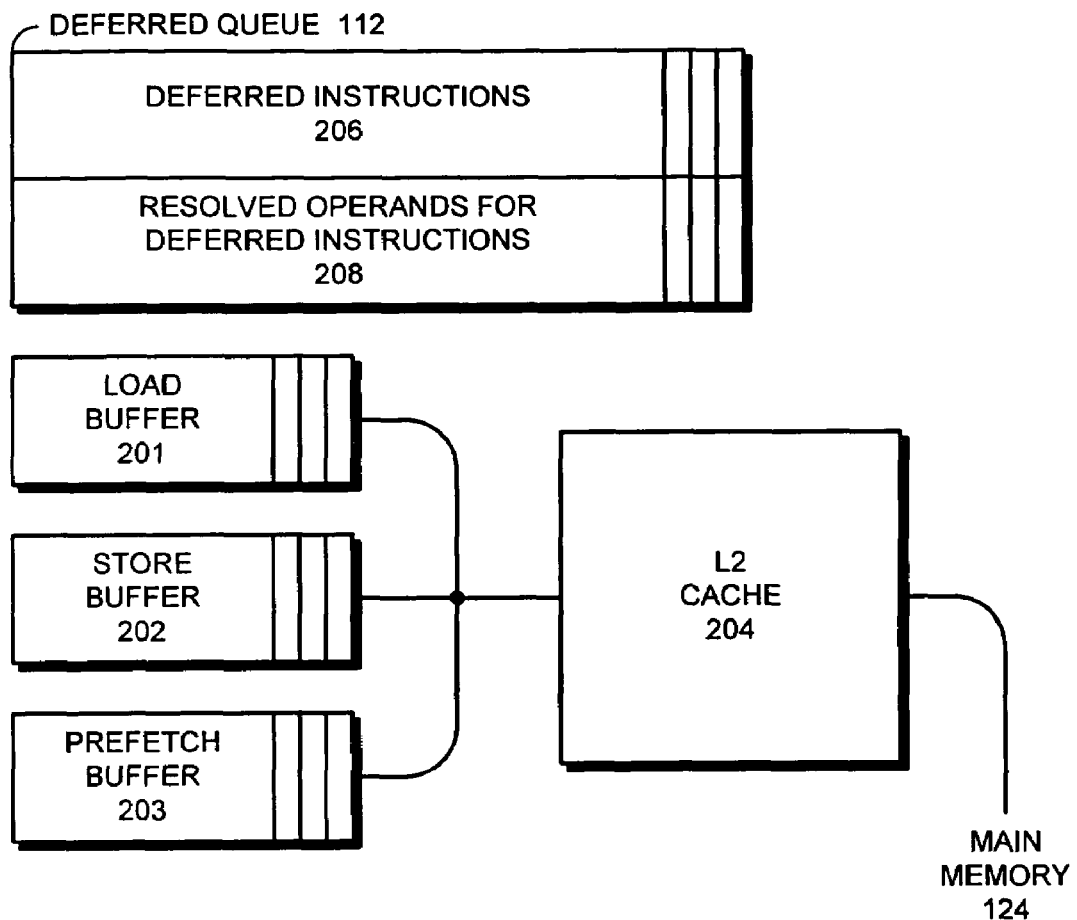
FIG. 2 illustrates various buffers within a processor in accordance with an embodiment of the present invention.

FIG. 2 illustrates various buffers and other structures within processor 100 in accordance with an embodiment of the present invention. These buffers and other structures include load buffer 201, store buffer 202, prefetch buffer 203 and L2 cache 204. All of these are well-known structures in existing processors. Load buffer 201, store buffer 202 and prefetch buffer 203 hold entries for load, store and prefetch instructions that are waiting to access slower portions of the memory hierarchy, such as L2 cache 204 and possibly main memory 124.

Also illustrated in FIG. 2 is deferred queue 112 (which also appears in FIG. 1). As was described above, deferred queue 112 stores deferred instructions 206, which are waiting for unresolved data dependencies to be resolved. In addition to storing deferred instructions, deferred queue 112 also stores corresponding operands 208 that have been resolved for the deferred instructions. When the deferred instructions 206 are finally executed in deferred mode, these deferred instructions 206 use the resolved source operands 208 from deferred queue 112, if such resolved operands were previously stored along with the instructions in the deferred queue 112. In this way, instructions following the deferred instructions that overwrite the resolved source operands will not create WAR hazards, because the deferred instructions will use the previously stored resolved operands 208 for the deferred instructions from deferred queue 112. This process is described in more detail below.

Keeping Track of Dependencies

The present invention keeps track of data dependencies in order to determine if an instruction is subject to an unresolved data dependency. In one embodiment of the present invention, this involves maintaining state information for each register, which indicates whether or not a value in the register depends on an unresolved data dependency.

Figure 3:
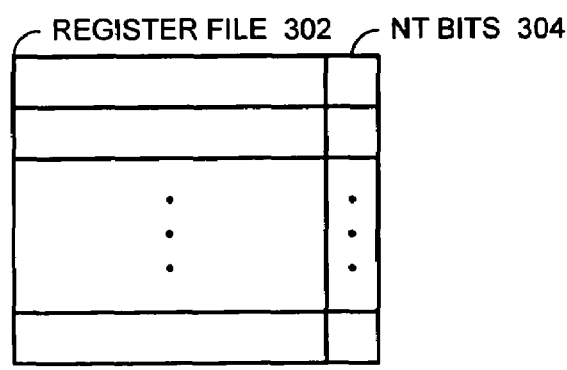
FIG. 3 illustrates a register file in accordance with an embodiment of the present invention.

For example, FIG. 3 illustrates a register file 302 in accordance with an embodiment of the present invention. Each register in register file 302 is associated with a "not-there" (NT) bit. During execute-ahead mode, the not-there bit keeps track of whether a valid operand value is contained in the register, or if the operand cannot be produced because of an unresolved data dependency. For example, if an instruction is waiting for a source operand to be produced by a load miss, the instruction is deferred and the not-there bit of the instruction's destination register is set to indicate that the desired result is not present in the destination register.

When a subsequent instruction references a source operand value that is marked as not-there, the system marks the destination register as not-there to indicate that the value in the destination register also depends on the unresolved data-dependency. This can be accomplished by marking the not-there bit of the destination register with the "OR" of the not-there bits for source registers of the instruction.

State Diagram

Figure 4:
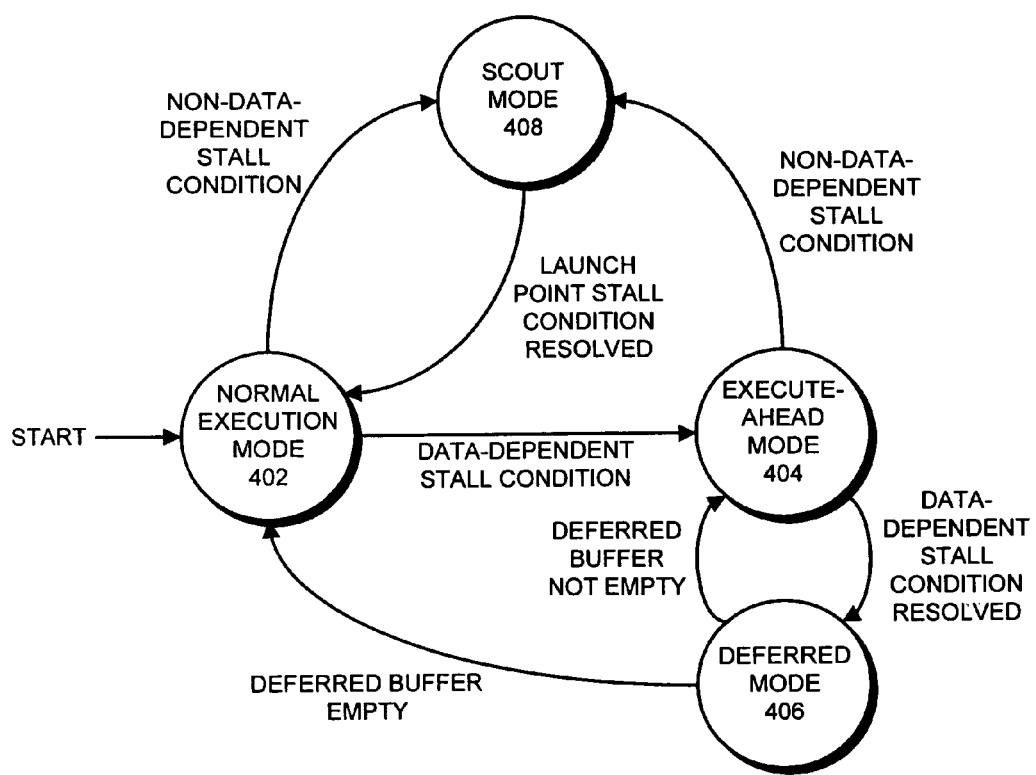
FIG. 4 presents a state diagram, which includes execute-ahead mode and scout mode, in accordance with an embodiment of the present invention.

FIG. 4 presents a state diagram which includes execute-ahead mode 404, deferred mode 406 and the scout mode 408 in accordance with an embodiment of the present invention. The system starts in normal-execution mode 402, wherein instructions are executed in program order as they are issued from instruction buffer 108 (see FIG. 1).

Next, if an unresolved data dependency arises during execution of an instruction, the system moves to execute-ahead mode 404. An unresolved data dependency can include: a use of an operand that has not returned from a preceding load miss; a use of an operand that has not returned from a preceding translation lookaside buffer (TLB) miss; a use of an operand that has not returned from a preceding full or partial read-after-write (RAW) from store buffer operation; and a use of an operand that depends on another operand that is subject to an unresolved data dependency.

While moving to execute-ahead mode 404, the system generates a checkpoint that can be used, if necessary, to return execution of the process to the point where the unresolved data dependency was encountered; this point is referred to as the "launch point." (Generating the checkpoint involves saving the precise architectural state of processor 100 to facilitate subsequent recovery from exceptions that arise during execute-ahead mode 404 or deferred mode 406.) The system also "defers" execution of the instruction that encountered the unresolved data dependency by storing the instruction in deferred queue 112.

While operating in execute-ahead mode 404, the system continues to execute instructions in program order as they are received from instruction buffer 108; any instructions that cannot execute because of an unresolved data dependency are deferred into deferred queue 112.

During execute-ahead mode 404, if an unresolved data dependency is finally resolved, the system moves into deferred mode 406, wherein the system attempts to execute instructions from deferred queue 112 in program order. Note that the system attempts to execute these instructions in program order with respect to other deferred instructions in deferred queue 112, but not with respect to other previously executed non-deferred instructions (and not with respect to deferred instructions executed in previous passes through deferred queue 112). During this process, the system defers execution of deferred instructions that still cannot be executed because of unresolved data dependencies by placing these again-deferred instructions back into deferred queue 112. On the other hand, the system executes other instructions that can be executed in program order with respect to each other.

After the system completes a pass through deferred queue 112, if deferred queue 112 is empty, the system moves back into normal-execution mode 402. This may involve committing changes made during execute-ahead mode 404 and deferred mode 406 to the architectural state of processor 100, if such changes have not been already committed. It can also involve throwing away the checkpoint generated when the system moved into execute-ahead mode 404.

On the other hand, if deferred queue 112 is not empty after the system completes a pass through deferred queue 112, the system returns to execute-ahead mode 404 to execute instructions from instruction buffer 108 from the point where the execute-ahead mode 404 left off.

If a non-data dependent stall condition arises while the system is in normal-execution mode 402 or in execute-ahead mode 404, the system moves into scout mode 408. (This non-data-dependent stall condition can include a memory barrier operation, or a deferred queue full condition.) In scout mode 408, instructions are speculatively executed to prefetch future memory operations, but results are not committed to the architectural state of processor 100.

Scout mode 408 is described in more detail in a pending U.S. patent application entitled, "Generating Prefetches by Speculatively Executing Code Through Hardware Scout Threading," by inventors Shailender Chaudhry and Marc Tremblay, having Ser. No. 10/741,944, and filing date 19 Dec. 2003, which is hereby incorporated by reference to describe implementation details of scout mode 408.

Unfortunately, computational operations performed during scout mode 408 need to be recomputed again, which can require a large amount of computational work.

When the original "launch point" stall condition is finally resolved, the system moves back into normal-execution mode 402, and, in doing so, uses the previously generated checkpoint to resume execution from the launch point instruction that encountered the launch point stall condition. The launch point stall condition is the stall condition that originally caused the system to move out of normal-execution mode 402. For example, the launch point stall condition can be the data-dependent stall condition that caused the system to move from normal-execution mode 402 to execute-ahead mode 404, before moving to scout mode 408. Alternatively, the launch point stall condition can be the non-data-dependent stall condition that caused the system to move directly from normal-execution mode 402 to scout mode 408.

Processing an Instruction in Execute-Ahead Mode

Figure 5:
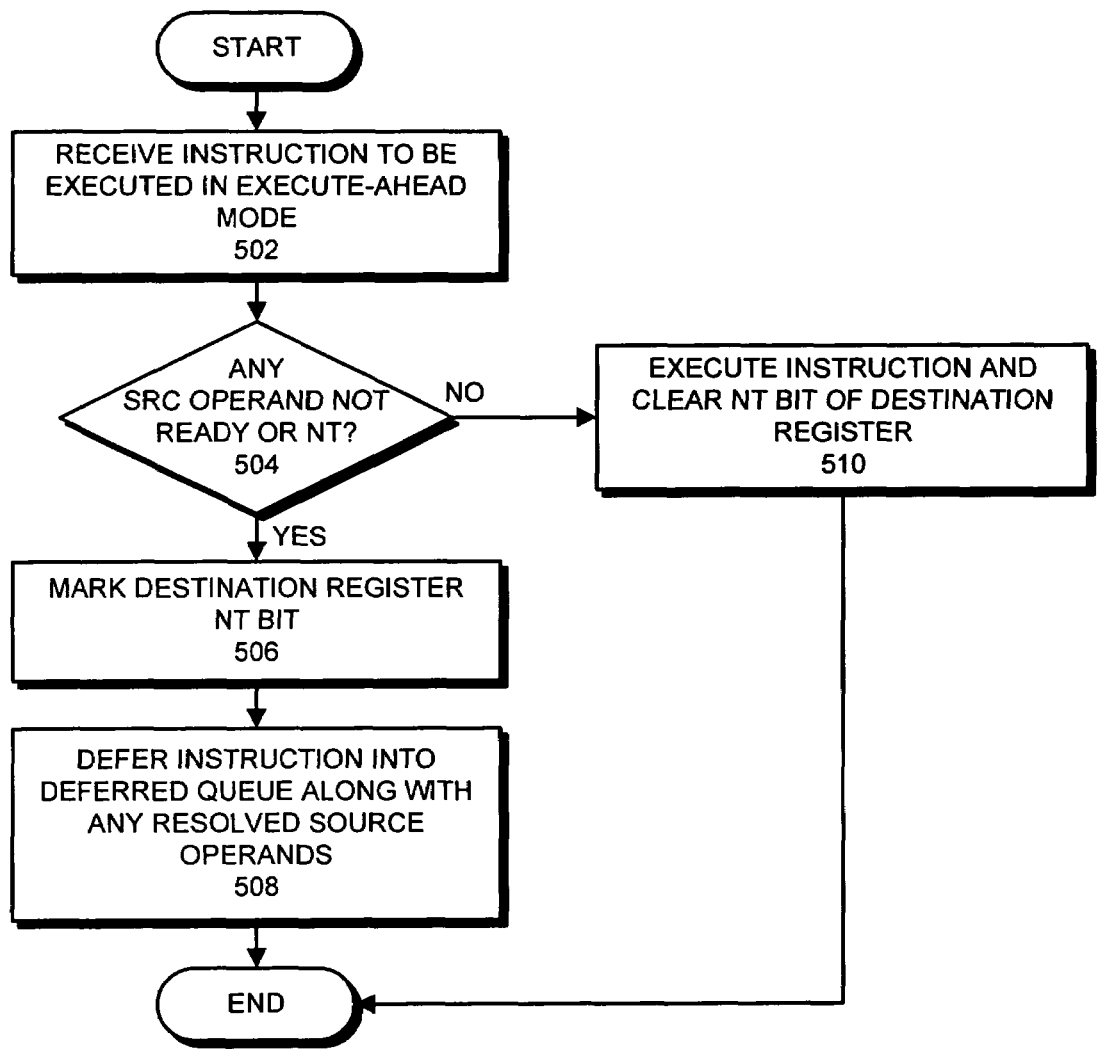
FIG. 5 presents a flow chart illustrating how an instruction is processed in execute-ahead mode in accordance with an embodiment of the present invention.

FIG. 5 presents a flow chart illustrating how an instruction is processed in execute-ahead mode in accordance with an embodiment of the present invention. The process starts when the system receives an instruction to be executed during execute-ahead mode (step 502).

Next, the system determines if any source operand for the instruction is "not ready" or is "not there" (step 504). A source operand is "not ready" if a memory reference has not returned a value for the source operand. For example, a source operand is not-ready if the operand has not returned from: a preceding load miss, a preceding translation lookaside buffer (TLB) miss, or a preceding full or partial read-after-write (RAW) from store buffer operation. A source operand is "not there" if the not-there bit of a register containing the source operand is set.

If any source operand for the instruction is not ready or is not there, the system marks the NT bit of the destination register for the instruction (step 506) and defers the instruction by placing the instruction in the deferred queue 112. Note that the instruction is placed into the deferred queue along with any source operands for the instruction which are resolved (step 508). This prevents WAR hazards as is described in more detail below.

On the other hand, if all source operands for the instruction are available, the system executes the instruction, and writes a result (if there is one) to the destination register. The system also clears the NT bit of the destination register to indicate that the value in the destination register has been resolved (step 510).

Processing an Instruction in Deferred Mode

Figure 6:
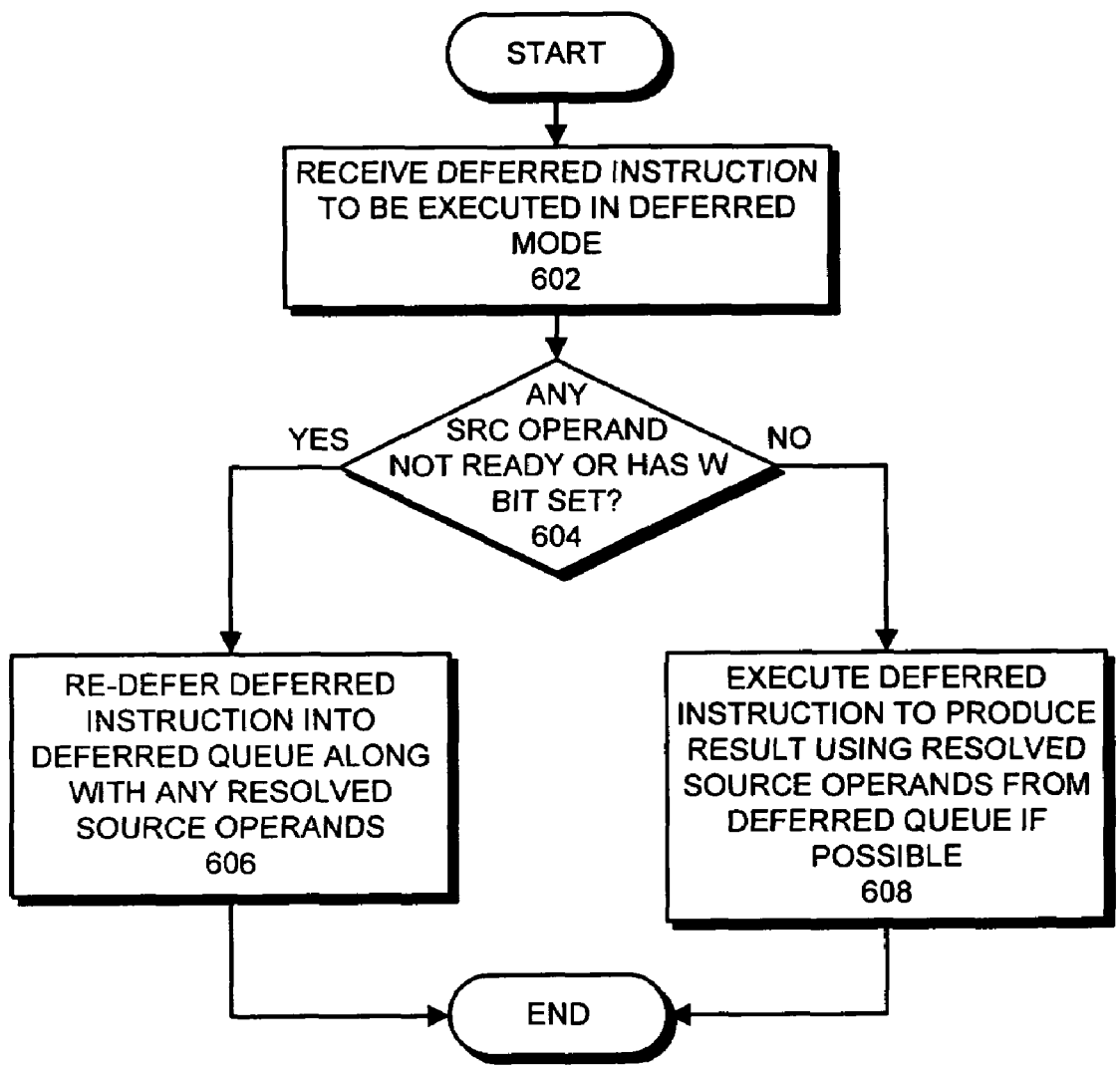
FIG. 6 presents a flow chart illustrating how an instruction is processed in deferred mode in accordance with an embodiment of the present invention.

FIG. 6 presents a flow chart illustrating how an instruction is processed in deferred mode in accordance with an embodiment of the present invention. The process starts when the system receives a deferred instruction to be executed during deferred mode (step 602).

Next, the system determines if any source operand for the deferred instruction is "not ready" (step 604). If so, the system re-defers the instruction by placing the instruction in the deferred queue 112 along with any resolved source operands (to prevent WAR hazards) (step 606).

On the other hand, if all source operands for the deferred instruction are available, the system executes the deferred instruction using any resolved source operands that are available from the deferred queue (step 608). This avoids a WAR hazard because after a resolved operand is written into the deferred queue along with a deferred instruction, the architectural register containing the resolved operand can be overwritten by an instruction which follows the deferred instructed in program order but which is executed before the deferred instruction. This overwriting of the architectural register by a following instruction does not affect the source operand in the deferred queue, which is subsequently used by the deferred instruction.

Register File Versions

Figure 7:
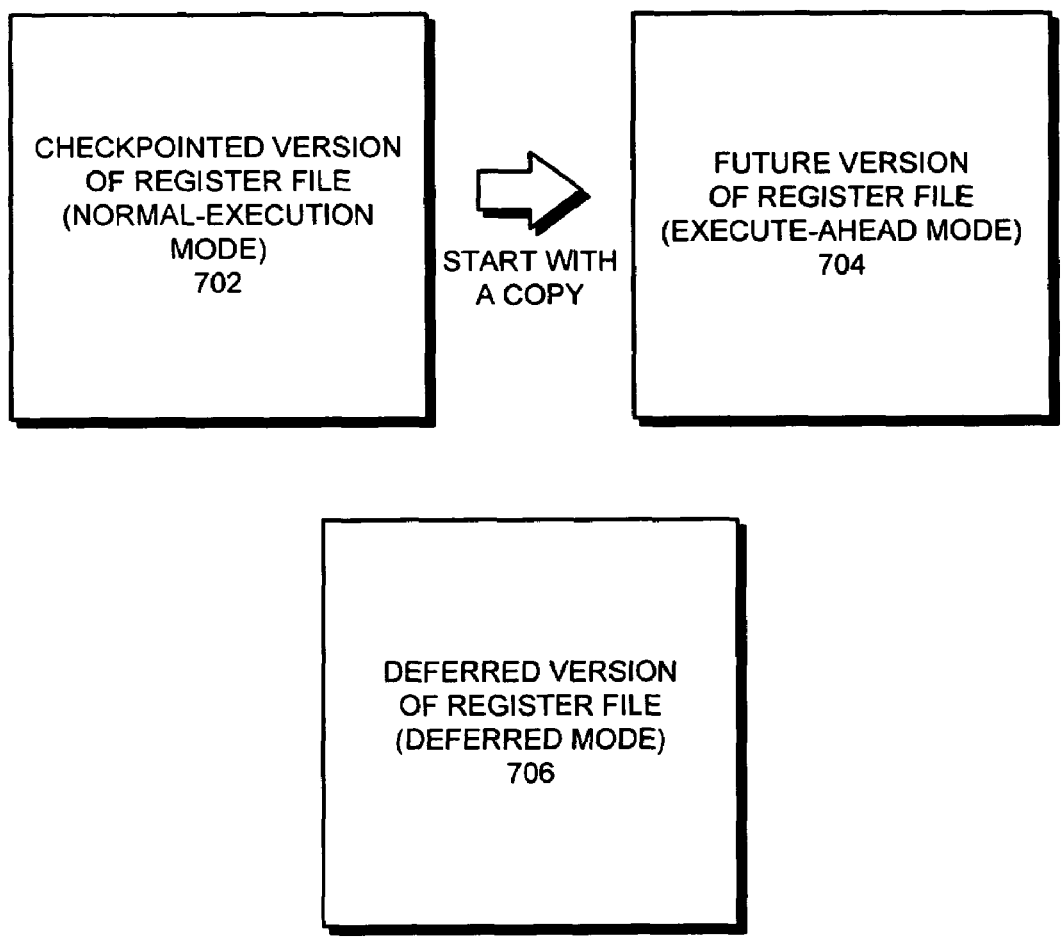
FIG. 7 illustrates three different versions of a register file in accordance with an embodiment of the present invention.

FIG. 7 illustrates three different versions of a register file in accordance with an embodiment of the present invention. A "checkpointed" version of the register file 702 contains the checkpointed state of the register file which was created when the system left normal-execution mode. In one embodiment of the present invention, during normal-execution mode the system operates on the checkpointed version of the register file 702. Hence, the checkpointed version of the register file 702 can alternatively be referred to as the "normal" version of the register file.

The "future" version of the register file 704 is operated on during execute-ahead mode (or scout mode). At the beginning of execute-ahead mode, the system starts by copying the checkpointed version of the register file 702 to the future version of the register file 704. The system then operates on the future version of the register file 704 during execute-ahead mode.

Finally, the "deferred" version of the register file 706 is operated on during deferred mode. As was described above, while executing an instruction in deferred mode, the system obtains previously resolved source operands from the deferred queue 112, while other, more-recently-resolved source operands are obtained from the deferred version of the register file 706.

Accessing Registers During Deferred Mode

While executing in deferred mode, the system obtains previously-resolved source operands from the deferred buffer. Recall that these previously-resolved source operands were stored into the deferred buffer along with the deferred instructions. The system obtains other source operands, which were not stored in the deferred buffer, from the deferred version of the register file 706.

Figure 8:
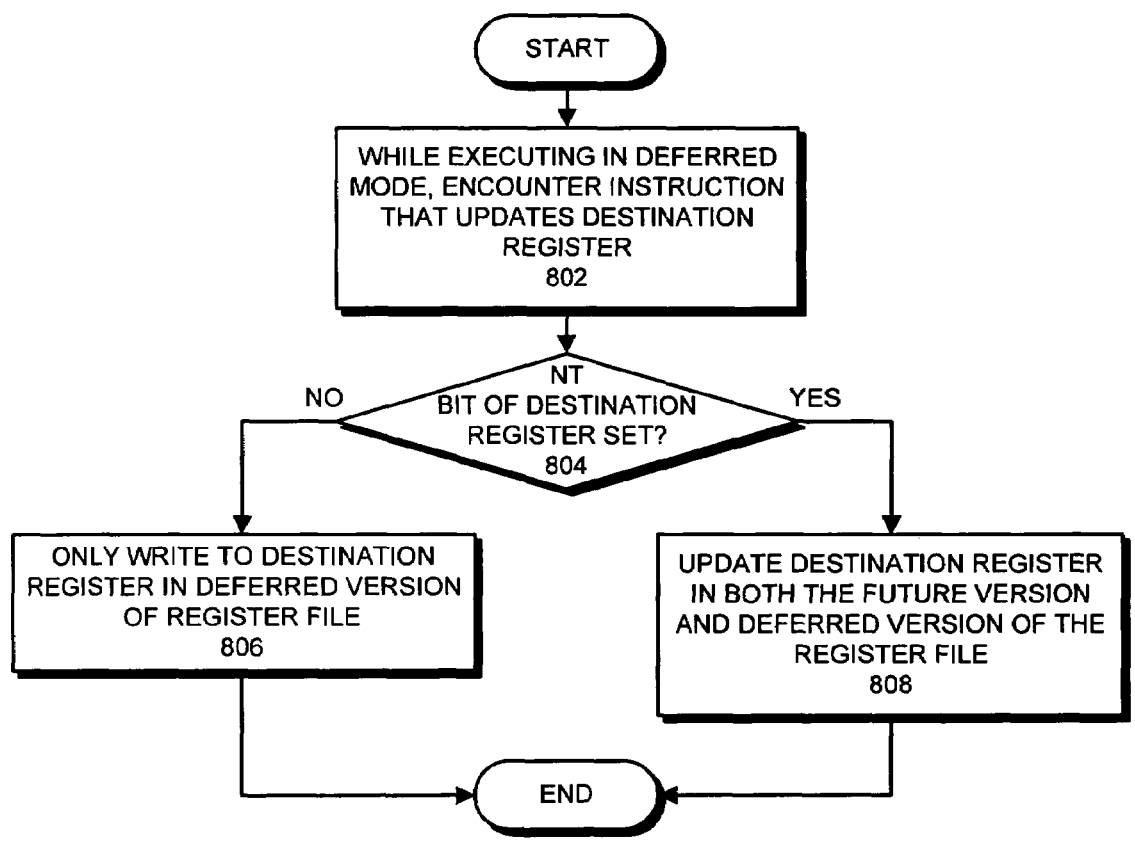
FIG. 8 presents a flow chart illustrating how the system updates the register files during deferred mode in accordance with an embodiment of the present invention.

While executing in deferred mode, the system updates destination registers as is illustrated by the flow chart in FIG. 8. Upon encountering a deferred instruction which updates a destination register (step 802), the system determines if the not-there bit of the destination register is set (step 804). If so, the system updates the destination register in both the future version of the register file 704 and the deferred version of the register file 706 (step 808).

Otherwise, if the not-there bit of the destination register is not set, an instruction following the deferred instruction in program order has already updated the destination register. In this case, allowing the deferred instruction to overwrite the destination register would cause a write-after-write (WAW) hazard. Hence, in order to prevent this WAW hazard, the system only updates the destination register in the deferred version of the register file 706, and does not update the future version of the register file (step 806).

Multiprocessor System

Figure 9:
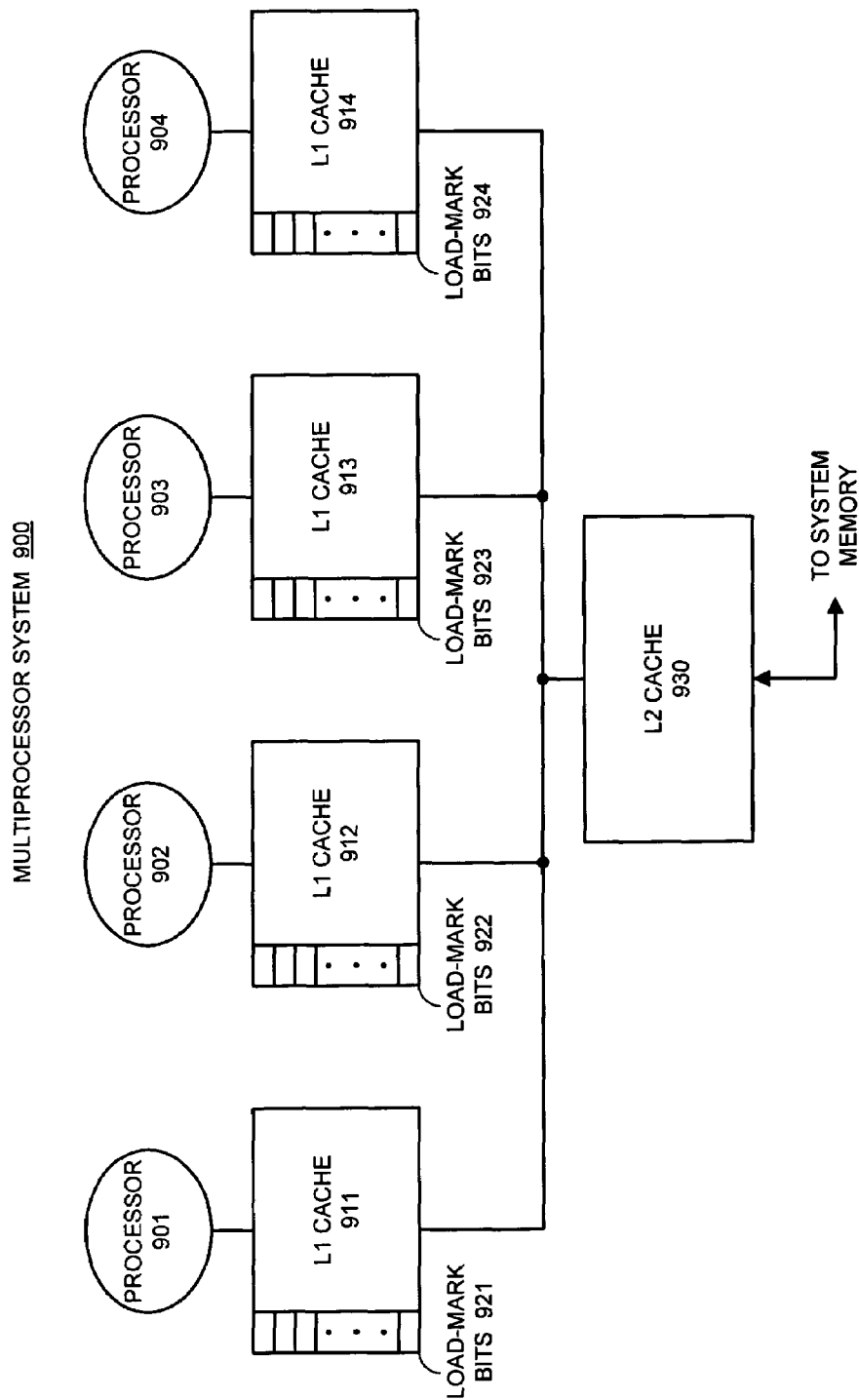
FIG. 9 illustrates a multiprocessor system in accordance with an embodiment of the present invention.

FIG. 9 illustrates a multiprocessor system 900 in accordance with an embodiment of the present invention. Multiprocessor system 900 includes a number of processors 901-904, which are coupled to Level One (L1) caches 911-914, respectively. Note that the L1 caches 911-914 may be separate instruction and data caches, or alternatively, unified instruction/data caches. L1 caches 911-914 are coupled to Level Two (L2) cache 930 through coherence bus 922. L2 cache 930 is coupled to the system memory.

In one embodiment of the present invention, L1 caches 911-914 are write-through caches, which means that all updates to L1 caches 911-914 are automatically propagated to L2 cache 930. This simplifies the coherence protocol, because if processor 901 requires a data item that is present in L1 cache 912, processor 901 can receive the data from L2 cache 930 without having to wait for L1 cache 912 to source the data. Moreover, no forwarding network is needed to allow L1 cache 912 to source the data. In one embodiment of the present invention, L2 cache 930 is an "inclusive cache," which means that all items in L1 caches 911-914 are included in L2 cache 930.

Note that cache lines within L1 caches 911-914 contain "load-mark bits," 921-924, respectively. These load-mark bits indicate that the cache lines have been loaded from during speculative execution. The system uses these load-mark bits along with invalidation signals received from coherence bus 922 to enforce memory reference ordering requirements during speculative execution. This process is described in more detail below.

Although the present invention is described with reference to multiprocessor system 900 illustrated in FIG. 9, the present invention is not meant to be limited to this specific multiprocessor system and can in general be applied to any multiprocessor system which includes processors with L1 caches and a cache-coherence mechanism. Moreover, although the present invention is described in the context of a write-through cache, one of ordinary skill in the art can easily make the modifications necessary to apply the present invention to a write-back cache.

Starting Speculative Execution

Figure 10:
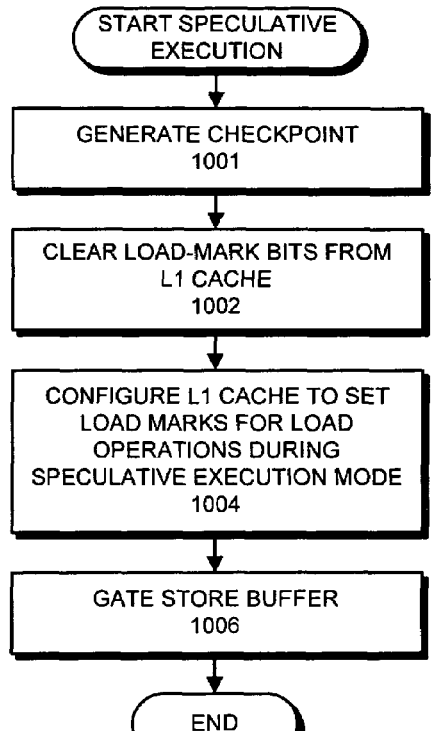
FIG. 10 presents a flow chart illustrating the process of starting speculative execution in accordance with an embodiment of the present invention.

FIG. 10 presents a flow chart illustrating the process of starting speculative execution in accordance with an embodiment of the present invention. Note that this speculative execution can include execute-ahead mode or scout mode. First, the system generates a checkpoint in case an exception condition arises during speculative execution (step 1001). Then, the system clears all load-mark bits in the L1 cache (step 1002). Note that load mark-bits can alternatively be cleared when the processor enters normal-execution mode before speculative execution starts. Also note that the load mark-bits can be cleared using a "flash-clear" operation using the same circuitry that is presently used to flash-clear "valid bits" within cache lines. Next, the system configures the L1 cache so that the L1 cache sets load-mark bits whenever a cache line is subsequently loaded during speculative execution (step 1004). The system also gates the store buffer so that subsequent speculative store operations will not be released by the store buffer (step 1006).

Processing an Invalidation Signal

The present invention enforces memory reference ordering requirements during speculative execution without using a memory-disambiguation buffer to detect potential problems. Instead, the present invention uses the existing cache-coherence mechanism and L1 caches to detect these problems. In particular, the present invention examines invalidations signals received at an L1 cache to determine whether an L1 cache line (that has been loaded from during speculative execution) is presently being updated. If so, a violation of the memory model is likely, and the speculative execution is "failed."

Figure 11:
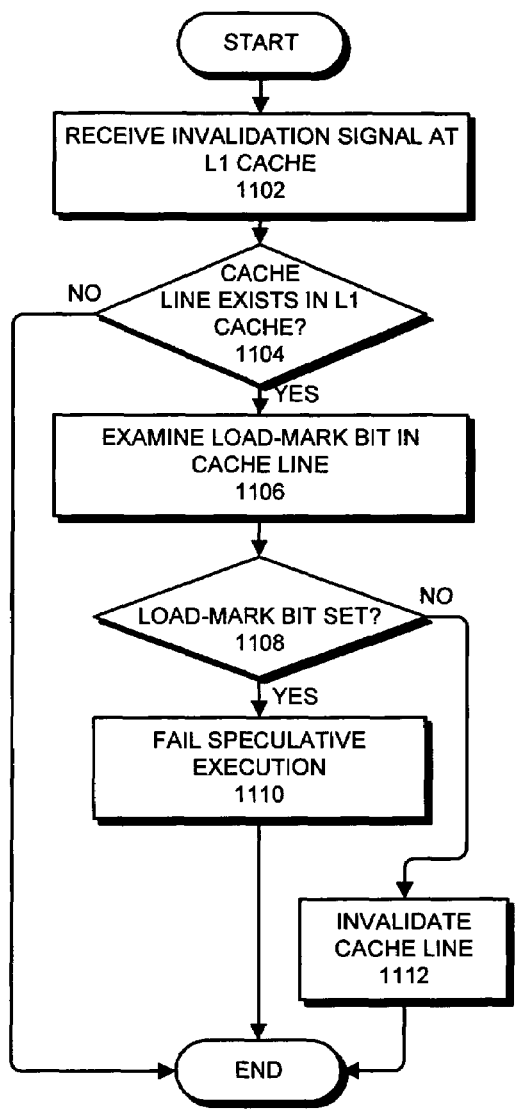
FIG. 11 presents a flow chart illustrating the processing of an invalidation signal in accordance with an embodiment of the present invention.

More specifically, FIG. 11 presents a flow chart illustrating the processing of an invalidation signal in accordance with an embodiment of the present invention. During operation of the system, the L1 cache receives an invalidation signal for a cache line from the cache-coherence system of the multiprocessor (step 1102). Next, the system performs a lookup to determine if the corresponding cache line is present in the L1 cache (step 1104). If not, the process terminates. (Note that in some systems, which include a reverse directory at the L2 cache, the L1 cache will only receive an invalidation signal if the L1 cache has the associated cache line. In this type of system, the lookup still takes place to locate the cache line, but the determination of whether the cache line exists in the L1 cache is not necessary.)

Next, the system examines the load-mark bit in the cache line (step 1106). If the load-mark bit is set, which indicates that the cache line has been loaded from during speculative execution, the system fails the speculative execution of the thread that owns the line to prevent a possible violation of the memory model (step 1110). On the other hand, if the load-mark bit is not set, the system invalidates the cache line (step 1112) and continues executing in speculative-execution mode.

Cache Line Eviction

Note that if a cache line whose load-mark bit is set is evicted from the L1 cache during speculative execution, it will not be possible to subsequently examine the load-mark because the cache line will be evicted. In this case, the system fails the speculative execution of the thread that owns the line to avoid potential problems that result from not being able to detect a memory model violation involving the cache line.

Failing Speculative-Execution Mode

Figure 12:
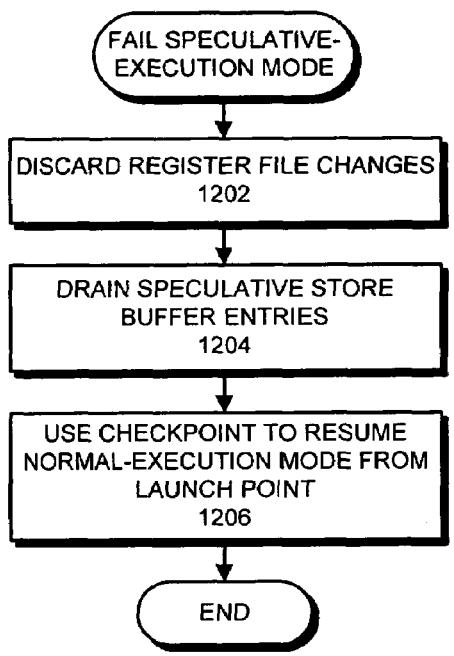
FIG. 12 presents a flow chart illustrating the process of failing speculative execution mode in accordance with an embodiment of the present invention.

FIG. 12 presents a flow chart illustrating the process of failing speculative execution in accordance with an embodiment of the present invention. During this process, the system discards register file changes made during speculative execution (step 1202), and drains store buffer entries generated during speculative execution from the store buffer (step 1204). The system also uses the checkpoint to resume normal non-speculative execution from the launch-point instruction (the instruction that initially started the speculative execution) (step 1206).

Returning the Normal-Execution Mode

Figure 13:
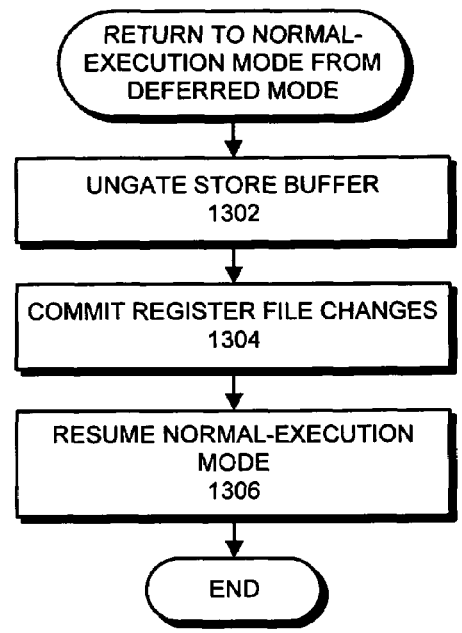
FIG. 13 presents a flow chart illustrating the process of returning to normal-execution mode from deferred mode in accordance with an embodiment of the present invention.

FIG. 13 presents a flow chart illustrating the process of successfully returning to normal-execution mode from execute-ahead/deferred mode in accordance with an embodiment of the present invention. During this process, the system ungates the store buffer so that stores generated during execute-ahead/deferred mode can drain (step 1302). The system also commits register file changes made during execute-ahead/deferred mode (step 1304). (This may simply involve making the future version of the register file the architectural version of the register file.) Finally, the system resumes normal-execution mode from the place where execute-ahead mode left off (step 1306).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for enforcing memory reference ordering requirements at a Level 1 (L1) cache in a multiprocessor, comprising:
   receiving an invalidation signal for a cache line at the L1 cache while executing instructions in a speculative-execution mode, wherein the invalidation signal is received from a cache-coherence system within the multiprocessor;
   in response to the invalidation signal,
      if the cache line exists in the L1 cache, examining a load-mark in the cache line, wherein the load-mark being set indicates that the cache line has been loaded from during the speculative-execution mode, and
      if the load-mark is set, failing the speculative-execution mode and resuming a normal-execution mode from a checkpoint, whereby failing the speculative-execution mode ensures that a potential update to the cache line indicated by the invalidation signal will not cause the memory reference ordering requirements to be violated during the speculative-execution mode.

2. The method of claim 1, wherein prior to receiving the invalidation signal the method further comprises entering the speculative-execution mode by:
   issuing instructions for execution in program order during a normal-execution mode;
   upon encountering a condition (a launch condition) during an instruction (a launch-point instruction), which causes the processor to enter the speculative-execution mode,
      generating the checkpoint that can subsequently be used to return execution of the program to the launch-point instruction, and
      commencing execution in the speculative-execution mode.

3. The method of claim 2, wherein commencing execution in the speculative-execution mode involves:
   clearing load-marks from all cache lines in the L1 cache;
   configuring the L1 cache so that a subsequent load operation from a cache line during the speculative-execution mode causes a corresponding load-mark in the cache line to be set; and
   gating a store buffer so that the store buffer will not release stores that are generated during the speculative-execution mode.

4. The method of claim 2, wherein failing the speculative-execution mode involves using the checkpoint to resume execution in the normal-execution mode from the launch-point instruction.

5. The method of claim 2,
   wherein the launch condition is an unresolved data dependency encountered while executing the launch-point instruction; and
   wherein the speculative-execution mode is an execute-ahead mode, wherein instructions that cannot be executed because of an unresolved data dependency are deferred, and wherein other non-deferred instructions are executed in program order.

6. The method of claim 5,
   wherein if the unresolved data dependency is resolved during execute-ahead mode, the method further involves executing deferred instructions in a deferred mode, wherein deferred instructions that able to be executed are executed in program order, and wherein other deferred instructions that still cannot be executed because of unresolved data dependencies are deferred again;
   wherein if some deferred instructions are deferred again during the deferred mode, the method further involves returning to execute-ahead mode at the point where execute-ahead mode left off; and
   wherein if all deferred instructions are executed in the deferred mode, the method further involves returning to the normal-execution mode to resume normal program execution from the launch-point instruction.

7. The method of claim 6, wherein returning to the normal-execution mode involves ungating a store buffer so that the store buffer releases stores that were generated during the speculative-execution mode.

8. The method of claim 2, wherein generating the checkpoint involves saving a precise architectural state of the processor to facilitate subsequent recovery from exceptions that arise during the speculative-execution mode.

9. The method of claim 1,
   wherein the launch condition is a stall condition; and
   wherein the speculative-execution mode is a scout mode, wherein instructions are speculatively executed to prefetch future loads and stores, but wherein results are not committed to the architectural state of the processor.

10. The method of claim 1, wherein if a load-marked cache line is evicted from the L1 cache during the speculative-execution mode, the method further comprises failing the speculative-execution mode and resuming the normal-execution mode from the checkpoint.

11. An apparatus that enforces memory reference ordering requirements at a Level 1 (L1) cache in a multiprocessor, comprising:
   a processor which is coupled to the L1 cache;
   wherein if the L1 cache receives an invalidation signal for a cache line while the processor is executing instructions in a speculative-execution mode, and if the cache line exists in the L1 cache, the apparatus is configured to,
      examine a load-mark in the cache line, wherein the load-mark being set indicates that the cache line has been loaded from during the speculative-execution mode, and
      if the load-mark is set, to cause the processor to fail the speculative-execution mode and to resume a normal-execution mode from a checkpoint, whereby failing the speculative-execution mode ensures that a potential update to the cache line indicated by the invalidation signal will not cause the memory reference ordering requirements to be violated during the speculative-execution mode.

12. The apparatus of claim 11, wherein the processor is configured to:
   issue instructions for execution in program order during a normal-execution mode; and
   wherein upon encountering a condition (a launch condition) during an instruction (a launch-point instruction), which causes the processor to enter the speculative-execution mode, the processor is configured to, generate the checkpoint that can subsequently be used to return execution of the program to the launch-point instruction, and to commence executing instructions in the speculative-execution mode.

13. The apparatus of claim 12, wherein while commencing execution in the speculative-execution mode, the apparatus is configured to:

clear load-marks from all cache lines in the L1 cache;

configure the L1 cache so that a subsequent load operation from a cache line during the speculative-execution mode causes a corresponding load-mark in the cache line to be set; and to gate a store buffer so that the store buffer will not release stores that are generated during the speculative-execution mode.

14. The apparatus of claim 12, wherein while failing the speculative-execution mode, the processor is configured to use the checkpoint to resume execution in the normal-execution mode from the launch-point instruction.

15. The apparatus of claim 12, wherein the launch condition is an unresolved data dependency encountered while executing the launch-point instruction; and wherein the speculative-execution mode is an execute-ahead mode, wherein instructions that cannot be executed because of an unresolved data dependency are deferred, and wherein other non-deferred instructions are executed in program order.

16. The apparatus of claim 15, wherein if the unresolved data dependency is resolved during execute-ahead mode, the processor is configured to execute deferred instructions in a deferred mode, wherein deferred instructions that able to be executed are executed in program order, and wherein other deferred instructions that still cannot be executed because of unresolved data dependencies are deferred again;

wherein if some deferred instructions are deferred again during the deferred mode, the processor is configured to return to execute-ahead mode at the point where execute-ahead mode left off; and wherein if all deferred instructions are executed in the deferred mode, the processor is configured to return to the normal-execution mode to resume normal program execution from the launch-point instruction.

17. The apparatus of claim 16, wherein while returning to the normal-execution mode, the processor is configured to ungate a store buffer so that the store buffer releases stores that were generated during the speculative-execution mode.

18. The apparatus of claim 12, wherein while generating the checkpoint, the processor is configured to save a precise architectural state of the processor to facilitate subsequent recovery from exceptions that arise during the speculative-execution mode.

19. The apparatus of claim 11, wherein the launch condition is a stall condition; and wherein the speculative-execution mode is a scout mode, wherein instructions are speculatively executed to prefetch future loads and stores, but wherein results are not committed to the architectural state of the processor.

20. The apparatus of claim 11, wherein if a load-marked cache line is evicted from the L1 cache during the speculative-execution mode, the processor is configured to fail the speculative-execution mode and to resume the normal-execution mode from the checkpoint.

21. A multiprocessor system that enforces memory reference ordering requirements at a Level 1 (L1) cache, comprising:

a plurality of processors;

a shared memory coupled to the plurality of processors;

wherein a given processor within the plurality of processors is coupled to the L1 cache;

wherein if the L1 cache receives an invalidation signal for a cache line at while the given processor is executing instructions in a speculative-execution mode, and if the cache line exists in the L1 cache, the L1 cache is configured to, examine a load-mark in the cache line, wherein the load-mark being set indicates that the cache line has been loaded from during the speculative-execution mode, and if the load-mark is set, to cause the given processor to fail the speculative-execution mode and to resume a normal-execution mode from a checkpoint, whereby failing the speculative-execution mode ensures that a potential update to the cache line indicated by the invalidation signal will not cause the memory reference ordering requirements to be violated during the speculative-execution mode.

* * * * *